(12) United States Patent
Jeffries et al.

(10) Patent No.: US 8,161,560 B2
(45) Date of Patent: *Apr. 17, 2012

(54) EXTENSIBLE FRAMEWORK FOR SYSTEM SECURITY STATE REPORTING AND REMEDIATION

(75) Inventors: Charles G. Jeffries, Sammamish, WA (US); Doug Coburn, Bellevue, WA (US); Barry Gerhardt, Woodinville, WA (US); Randall K. Winjum, Vashon, WA (US); Arindam Chatterjee, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/024,253

(22) Filed: Feb. 9, 2011

(65) Prior Publication Data

US 2011/0131659 A1 Jun. 2, 2011

Related U.S. Application Data

(63) Continuation of application No. 11/558,688, filed on Nov. 10, 2006, now Pat. No. 7,908,659.

(51) Int. Cl.
*G08B 23/00* (2006.01)
*G06F 12/16* (2006.01)

(52) U.S. Cl. ............................... 726/25; 726/1; 726/22

(58) Field of Classification Search ................. None
See application file for complete search history.

(56) References Cited

U.S. PATENT DOCUMENTS

| | | | | |
|---|---|---|---|---|
| 5,822,580 A | * | 10/1998 | Leung | 717/164 |
| 6,219,793 B1 | * | 4/2001 | Li et al. | 726/19 |
| 6,678,835 B1 | * | 1/2004 | Shah et al. | 714/4.12 |
| 6,907,531 B1 | | 6/2005 | Dodd et al. | |
| 6,983,317 B1 | | 1/2006 | Bishop et al. | |
| 7,426,550 B2 | * | 9/2008 | Abhishek et al. | 709/220 |
| 7,475,431 B2 | * | 1/2009 | Chao | 726/30 |
| 7,716,727 B2 | * | 5/2010 | Phillips et al. | 726/11 |
| 2002/0138763 A1 | * | 9/2002 | Delany et al. | 713/201 |
| 2004/0059920 A1 | * | 3/2004 | Godwin | 713/183 |
| 2004/0111639 A1 | * | 6/2004 | Schwartz et al. | 713/201 |
| 2004/0250107 A1 | | 12/2004 | Guo | |
| 2005/0021733 A1 | | 1/2005 | Clinton | |
| 2005/0086337 A1 | | 4/2005 | Quittek et al. | |

(Continued)

OTHER PUBLICATIONS

Bishop, Todd, "Microsoft Notebook: New player in security market," Seattle Post-Intelligencer, Mar. 8, 2004, http://seattlepi.nwsource.com/business/163611_msftnotebook08.html, [last accessed Aug. 24, 2006].

(Continued)

*Primary Examiner* — William Powers
(74) *Attorney, Agent, or Firm* — Perkins Coie LLP (57) ABSTRACT

A security health reporting system provides an application program interface (API) for use by independent software vendors (ISVs) to extend the security health reporting capabilities of the security health reporting system. An ISV security solution can register with the security health reporting system, create a schema that describes a new security class, and use the API to publish an instance of the schema for the new security class with the security health reporting system. When an instance of a schema for a new security class is published, the security health reporting system creates the new security class, and recognizes the definition for the security class within the security health reporting system. Registered ISV security solutions can then use the published schema to report their health statuses for the new security class.

20 Claims, 9 Drawing Sheets

U.S. PATENT DOCUMENTS

| | | |
|---|---|---|
| 2005/0086502 A1 | 4/2005 | Rayes |
| 2005/0091227 A1 | 4/2005 | McCollum |
| 2005/0114502 A1 | 5/2005 | Raden |
| 2005/0131997 A1 | 6/2005 | Lewis |
| 2005/0138204 A1 | 6/2005 | Iyer et al. |
| 2006/0085850 A1 | 4/2006 | Mayfield |
| 2006/0184714 A1 | 8/2006 | Dang |
| 2006/0212486 A1* | 9/2006 | Kennis et al. ............... 707/200 |
| 2008/0115218 A1 | 5/2008 | Jeffries et al. |

OTHER PUBLICATIONS

Lytle, David P., Veronica Resendez and Dr. Robert August, "Security in the Residential Network," SIGUCCS'05, Nov. 6-9, 2005, Monterey, California, USA, © 2005 ACM, pp. 197-201.

Read-Miller, Susan and Ruth A. Rosenthal, "Best Practices for Building a Security Operations Center," White Paper, Apr. 2005, Computer Associates®.

* cited by examiner

502 {
    <RegisterISV>
        <Company Name = /> —— 504
        <Product Identifier = /> —— 506
        <Digital Signature = /> —— 508
        <Path to Binary = /> —— 510
    </RegisterISV>

*FIG. 5*

602 {
  <State Map>
    604 {
      <State Values>
        <State Value = > —— 606
        <State Description = /> —— 608
        <State Expanded Text = /> —— 610
        <State Color = /> —— 612
        <State Alert = /> —— 614
      </State Values>
  </State Map>

*FIG. 6*

```
<Class = "Anti-phishing">                                    ～708
  <State Values>
    <State Value = "0">
      <State Description = "Off"/>                           ～712
      <State Expanded Text = "The anti-phishing software is turned off"/>
      <State Color = "Red"/>
      <State Alert = "True"/>
    <State Value = "1">
      <State Description = "On"/>                            ～714
      <State Expanded Text = "The anti-phishing software is turned On"/>
      <State Color = "Green"/>
      <State Alert = "False"/>
    ...
    <State Value = "5">
      <State Description = "Snooze"/>                        ～716
      <State Expanded Text = "The anti-phishing software is snoozed"/>
      <State Color = "Yellow"/>
      <State Alert = "True"/>
  </State Values>
  <State Attributes>
    <product name = />                    ～718
    <product state =>                     ～720
    <state severity rating =>             ～722
    <path to executable = />              ～724
    <path to logo = />                    ～726
  </State Attributes>
</Class>
```

EXTENSIBLE FRAMEWORK FOR SYSTEM SECURITY STATE REPORTING AND REMEDIATION

CROSS REFERENCE TO RELATED APPLICATION

This application is a Continuation of U.S. patent application No. 11/558,688, filed on Nov. 10, 2006, and entitled "EXTENSIBLE FRAMEWORK FOR SYSTEM SECURITY STATE REPORTING AND REMEDIATION," which is incorporated herein in its entirety by reference.

BACKGROUND

Although the Internet has had great successes in facilitating communications between computer systems and enabling electronic commerce, the computer systems connected to the Internet have been under almost constant attack by hackers seeking to disrupt their operation. Many of the attacks seek to exploit vulnerabilities of the application programs, operating systems, and other computer programs executing on those computer systems. One of the most destructive methods of attacking a computer system has been to infect the computer system with software that is designed specifically to damage or disrupt the computer system. Such software is referred to as "malware" because of its malicious nature. When malware invades a computer system, the integrity of the computer system is greatly compromised. Malware includes computer worms, viruses, Trojan horses, spyware, and so forth. Some malware behave nefariously, such as by illicitly collecting and transmitting personal information. Some malware can hijack resources needed by operating system components or use these resources to subvert the security of the operating system. For example, such malware can cause an unprotected network resource to open a TCP/IP port that allows a third party to access the operating system's resources.

Conventional techniques of detecting and disabling malware include installing anti-malware software and hardware products, such as antiviral software, spyware detection software, firewalls, and so forth. It is not uncommon for numerous anti-malware products to be installed and executing on a computer system. Each of the numerous anti-malware products that are executing on a computer system each generates its own report on the state of the health of the computer system. For example, an anti-virus product will generate a report regarding the presence of a virus, an anti-spyware product will generate a separate report regarding the presence of spyware, and an anti-phishing product will generate still a separate report regarding the exposure to a phishing attack. Unfortunately, the computer system user may easily become overwhelmed with the number of reports provided by the various anti-malware products that are executing. Moreover, the user may find it difficult to digest the information contained in the various reports to determine the actual health of the computer system.

SUMMARY

A method and system for providing an extensible framework for system security state reporting and remediation is provided. A security health reporting system provides an application program interface (API) for use by independent software vendors (ISVs) to extend the security health reporting capabilities of the security health reporting system. For example, an ISV security solution can register with the security health reporting system, create a schema that describes a new security class, and use the API to publish an instance of the schema for the new security class with the security health reporting system. When a registered ISV security solution publishes an instance of a schema for a new security class via the provided API, the security health reporting system creates the new security class, and recognizes the definition for the security class within the security health reporting system along with its own security solutions (i.e., the security solutions provided by the security health reporting system itself). Registered ISV security solutions can then use the published schema to report their health statuses (i.e., the security states) for the new security class. The security health reporting system can then display the reported health statuses on, for example, a user interface (UI), or similarly the status can be consumed through a subscriber API by an application that requires the computer security health state information to perform an operation.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

A method and system for providing an extensible framework for system security state reporting and remediation is provided. In some embodiments, a security health reporting system provides an application program interface (API) for use by independent software vendors (ISVs) to extend the security health reporting capabilities of the security health reporting system. For example, an ISV security solution can register with the security health reporting system, create a schema that describes a new security class, and use the API to publish an instance of the schema for the new security class with the security health reporting system. Examples of security classes include, by way of example, anti-virus, anti-phishing, anti-spyware, spam protection, worm protection, host intrusion prevention, firewall, parental controls, rootkit protection, and other security solutions that provide protection to computing systems. When a registered ISV security solution publishes an instance of a schema for a new security class via the provided API, the security health reporting system creates the new security class, and recognizes the definition for the security class within the security health reporting system along with its own security solutions (i.e., the security solutions provided by the security health reporting system itself). Registered ISV security solutions can then use the published schema to report their health statuses (i.e., the security states) for the new security class. The security health reporting system can then display the reported health statuses on, for example, a user interface (UI), or similarly the status can be consumed through a subscriber API by an application that requires the computer security health state information to perform an operation.

By way of an example scenario, Contoso Anti-virus Company may be developing a new personal computer (PC) security solution. This new solution scans for and remediates a new class of malware called "botware." Unfortunately, the security health reporting system as developed (i.e., "out-of-the-box") only provides anti-virus and anti-spyware security solutions, and does not include protection for this new class of malware. Because Contoso would like to add support for botware in the security health reporting system, Contoso creates a schema for a new security class for botware, names this security class "Botware Protection," and includes this schema with their software distribution. When the Contoso security solution program is installed on a computing system (e.g., an end user computer) that is running the security health reporting system, the Contoso security solution program registers with the security health reporting system, and uses the provided API to publish an instance of the schema for the security class Botware Protection. In response, the security health reporting system creates the Botware Protection security class within the security health reporting system, and recognizes the published definition for the Botware Protection security class. The Contoso security solution program can then report the health status for the new security class Botware Protection.

In some embodiments, the security health reporting system allows a publisher of an instance of a schema for a new security class to share the published schema with other applications. ISV applications that are knowledgeable of the shared schema can then consume and use the shared schema to report the health status for the security class defined by the shared schema. Consuming applications can also use the schema to consume or obtain the security health status reported through the schema. For example, a publishing ISV can share a published schema by requesting that the security health reporting system make the instance of the schema "public." In response, the security health reporting system makes the published schema available for consumption through an API. A knowledgeable ISV application can then programmatically consume the schema through the provided API. Continuing the botware example above, Target Anti-virus Company may have also developed a security solution that scans for and remediates botware. Moreover, Target may have knowledge of Contoso's schema for the security class Botware Protection. Because Target would like to report its health status to the security health reporting system using Contoso's schema, Target develops code to query and report using Contoso's schema, and includes this code with their software distribution. When the Target security solution program is installed on a computing system that is running both the security health reporting system and the Contoso security solution program, the Target security solution program registers with the security health reporting system, and uses the provided API to query Contoso's published schema for the security class Botware Protection. The Target security solution program can then use Contoso's schema to report its (i.e., Target's) health status for the security class Botware Protection to the security health reporting system.

In some embodiments, the security health reporting system provides its own security solutions. For example, the security health reporting system may directly provide security solutions for the security class anti-virus and the security class anti-spyware. The security health reporting system may share the schemas that describe one or both of these security classes with other applications. Consuming applications that are knowledgeable of the shared schemas can then consume and use the shared schema to report their health status for the shared security class and/or obtain the security health status reported through the schema.

In some embodiments, the security health reporting system verifies the identity of an application prior to allowing the application to use a shared schema. For example, the security health reporting system may verify the digital identity of an application prior to allowing the application to use the provided API to write data in the class instance described by the shared schema.

In some embodiments, the security health reporting system consolidates and synthesizes the received health statuses reported by the security solutions, and provides a synthesized health status for consumption through an API. Within each security class, the security health reporting system may aggregate the health statuses reported for a security class to provide a single security state for the security class (i.e., a single indication of the health of the security class). For example, for each security class, the security health reporting system may aggregate the reported health statuses by selecting the best (i.e., the healthiest) health status that was reported for the security class, and provide the best reported health status as the single security state for the security class. The security health reporting system may also aggregate the single security states across the multiple security classes to provide a single indication of the overall health of a computing system. For example, the security health reporting system may aggregate the single security states across the security classes by picking the poorest (i.e., unhealthiest) single security state that was determined for a security class, and provide the poorest single security state as the single indication of the overall health of the computing system. In some embodiments, the security health reporting system displays the synthesized health status on a UI.

In some embodiments, the security health reporting system allows for remediation of registered ISV applications. A registered ISV security solution can use a published schema to provide a remediation program to the security health reporting system. The security health reporting system can then provide users access to the remediation program through, for example, a UI, and allow the users to launch (i.e., start) the remediation program directly from the UI. Additionally, subscribers or consumers of the reporting API may also access the path to the remediation program so that an ISV application may use the remediation program to secure the computer automatically (i.e. without user intervention). Continuing the botware example above, the Contoso security solution program may use the published schema to report to the security health reporting system that it is currently "out-of-date." Along with this report, the Contoso security solution program may have provided a path to an executable program that may be executed to obtain an updated version of the Contoso security solution program. The security health reporting system can then display the path to the executable program as a link on its UI, along with an alert that the Contoso security solution program is currently out-of-date. The user can then select (i.e., activate) the link to remediate the out-of-date Contoso security solution program directly through the security health reporting system.

In some embodiments, the security health reporting system provides for ISV product branding within the security health reporting system. A registered ISV security solution can use a published schema to provide its logo (i.e., brand) to the security health reporting system. For example, the ISV security solution may provide its logo when reporting its health status for a security class. The security health reporting system can then display the ISV security solution's brand along with the reported health status on its UI.

In some embodiments, the security health reporting system allows users to view the registered ISV security solutions that are reporting their health statuses to the security health reporting system. For example, the security health reporting system may display on a UI the names of the ISV security solutions along with their reported health statuses. The security health reporting system may also allow users to launch one or more ISV security solutions and/or stop the execution of one or more currently executing ISV security solutions directly from the UI.

Figure 1:
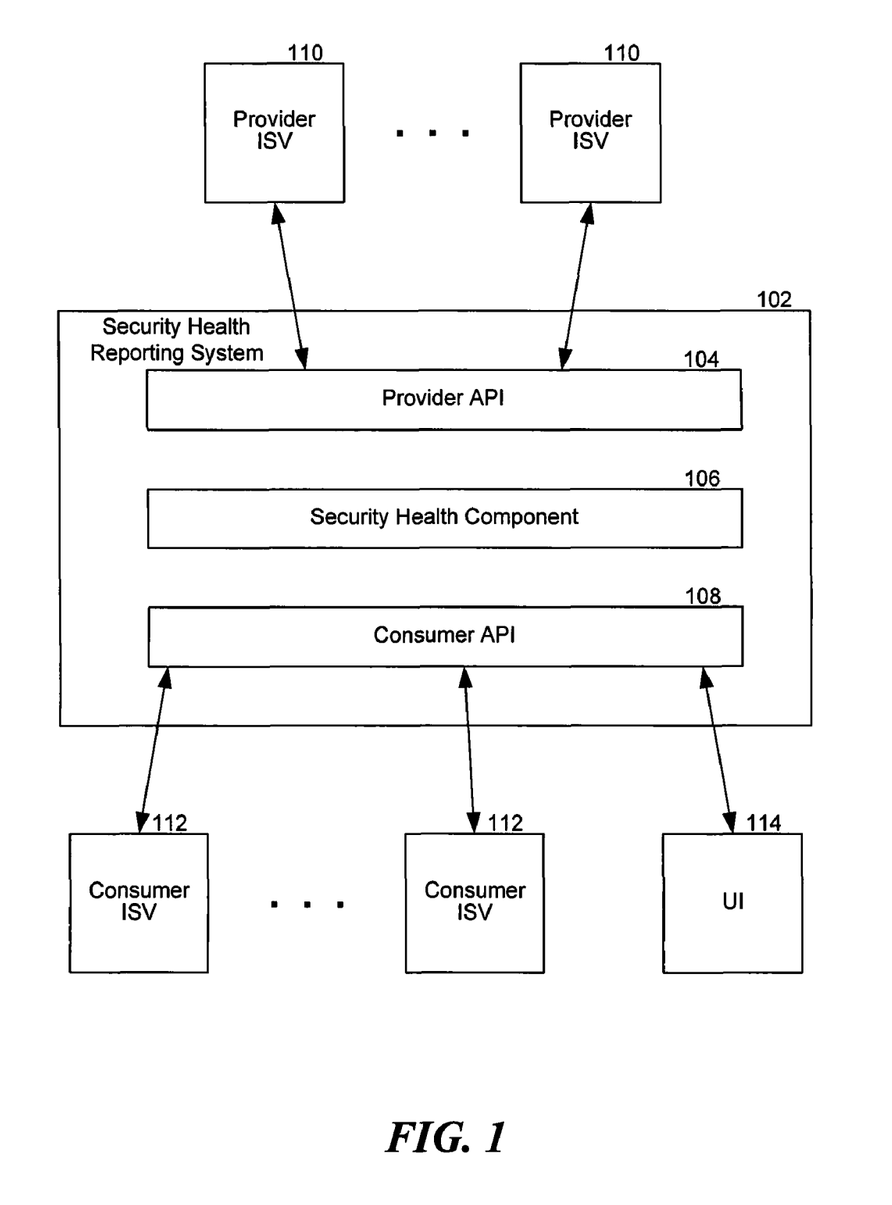
FIG. 1 is a block diagram that illustrates selected components of a security health reporting system, according to some embodiments.

FIG. 1 is a block diagram that illustrates selected components of a security health reporting system, according to some embodiments. The security health reporting system is implemented to execute within a computing system, and to function as a central, neutral security platform that evaluates, synthesizes, and reports on the various security heath states of the computing system. The security health reporting system also provides the user of the computing system a choice as to which security solutions on the computing system, including the security solutions directly provided by the security health reporting system, should be run, updated, and/or stopped. As depicted in FIG. 1, a security health reporting system 102 comprises a provider API 104, a security health component 106, and a consumer API 108. The provider API is the interface that allows both internal operating system components and software security solutions executing on the computer system to provide their security health statuses to the security health component. The security health component synthesizes the security health statuses reported by the various security solutions on the computer system. In some embodiments, the security health component may be implemented as a state machine that utilizes state tables to generalize the health statuses as reported by the security solutions. The consumer API is the interface that allows applications, including the software security solutions, to consume the synthesized or detailed security health statuses as reported by the security health component. Also depicted in FIG. 1 is a plurality of provider ISVs 110, a plurality of consumer ISVs 113, and a UI 114. Each of the provider ISVs are coupled to the provider API, and each of the consumer ISVs and the UI is coupled to the consumer API. The provider ISVs correspond to registered ISV security solutions that are reporting their health statuses to the security health reporting system. The consumer ISVs correspond to registered ISV applications that are knowledgeable of the shared schemas, and which are consuming the synthesized or detailed security health statuses. As consumers of the shared schemas, one or more of the consumer ISVs can also report their health statuses to the security health reporting system, thereby functioning as provider ISVs. The UI is the user interface that is provided by the security health reporting system. Although not shown in FIG. 1, the security health reporting system includes components that allow applications, including ISV security solutions, to register with the security health reporting system and publish instances of schemas that describe security classes. The security health reporting system may also include components that implement the security solutions that are directly provided by the security health reporting system. Accordingly, the aforementioned components of the security health reporting system are only illustrative and are not intended to suggest any limitation as to the implementation of the illustrated components and/or the scope of use or functionality of the security health reporting system.

The computing device on which the security health reporting system is implemented may include a central processing unit, memory, input devices (e.g., keyboard and pointing devices), output devices (e.g., display devices), and storage devices (e.g., disk drives). The memory and storage devices are computer-readable media that may contain computer executable instructions that implement the security health reporting system. As used herein, "computer-readable media encoded with computer executable instructions" means computer-readable media comprising computer executable instructions. In addition, the data structures and message structures may be stored or transmitted via a data transmission medium, such as a signal on a communications link. Various communication links may be used, such as the Internet, a local area network, a wide area network, a point-to-point dial-up connection, a cell phone network, and so on.

Embodiments of the security health reporting system may be implemented in various operating environments that include personal computers, server computers, hand-held or laptop devices, multiprocessor systems, microprocessor-based systems, programmable consumer electronics, digital cameras, network PCs, minicomputers, mainframe computers, network devices, distributed computing environments that include any of the above systems or devices, and so on. The computer systems may be cell phones, personal digital assistants, smart phones, personal computers, programmable consumer electronics, digital cameras, and so on.

The security health reporting system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
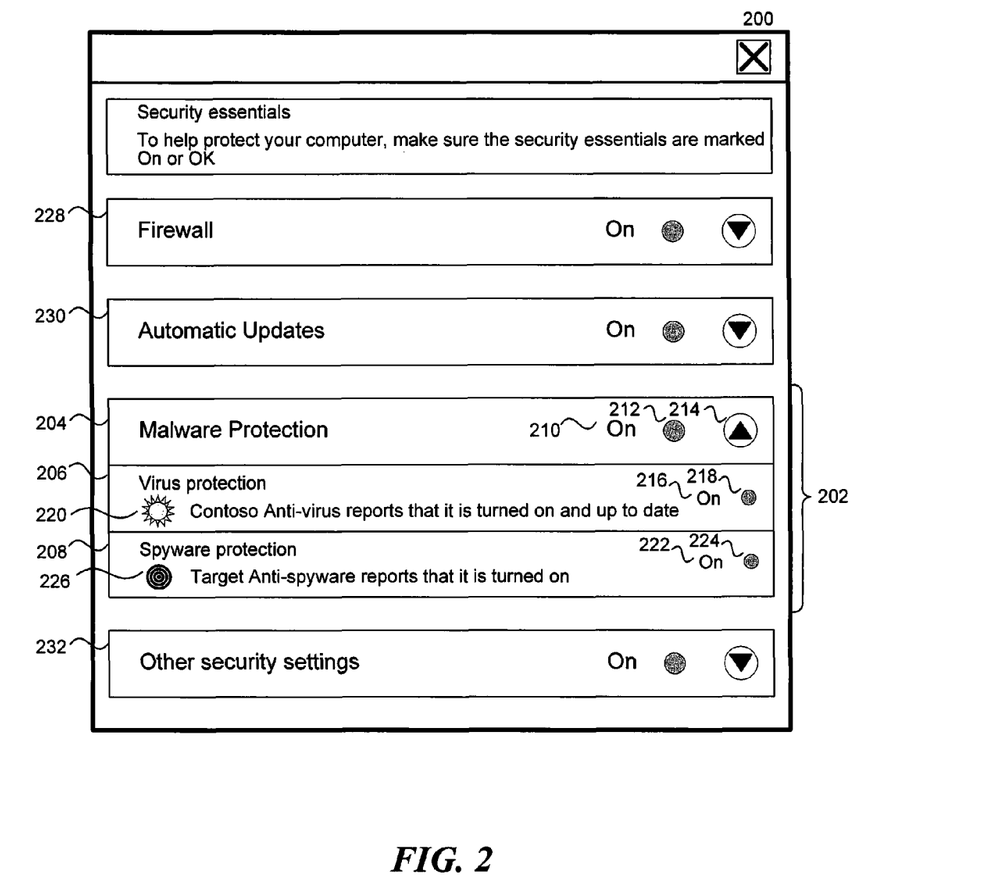
FIG. 2 is a display page that illustrates an example display of synthesized health statuses reported by the security health reporting system, according to some embodiments.

FIG. 2 is a display page that illustrates an example display of synthesized health statuses reported by the security health reporting system, according to some embodiments. A display page 200 includes a synthesized health status reporting area 202. The synthesized health status reporting area displays a synthesized health status for the computing system as determined from the health statuses reported to the security health reporting system. The synthesized health status reporting area includes a display box 204 that displays a single indication of the overall health of the computing system, and a plurality of display boxes 206 and 208 that each displays a single security state for a respective security class. In the example, display box 204 displays an indication that the overall health state of the computing system's malware protection is "on" as indicated by a text indicator 210 and a visual colored indicator 212 (e.g., a green colored indicator). Display box 204 also includes a control 214 that allows a user to control the display of additional information regarding the overall health of the computing system's malware protection. For example, control 214 was previously selected to cause the display of display boxes 206 and 208. As can be seen from the contents displayed in display boxes 206 and 208, virus protection and spyware protection security classes were synthesized to determine the overall health of the computing system's malware protection. Display box 206 displays an indication that the single security state of the virus protection (i.e., the anti-virus security class) on the computing system is "on" as indicated by a text indicator 216 and a visual color indicator 218 (e.g., a green colored indicator). The contents of display box 206 further indicate that the "Contoso Anti-virus" report is being used as the single security state of the virus protection on the computing system. Display box 206 also displays a logo 220 of the ISV Contoso. Display box 208 displays an indication that the single security state of the spyware protection (i.e., the anti-spyware security class) on the computing system is "on" as indicated by a text indicator 222 and a visual color indicator 224 (e.g., a green colored indicator). The contents of display box 208 further indicate that the "Target Anti-spyware" report is being used as single security state of the spyware protection on the computing system. Display box 208 also displays a logo 226 of the ISV Target. Display page 200 also includes display boxes 228, 230 and 232. Display box 228 displays an indication of the firewall health status that is being reported to the security health reporting system running on the computing system. Display box 230 displays an indication of the status of the automatic updates feature provided by the security health reporting system. Display box 232 displays an indication of the synthesized status for the other security settings that is being reported to the security health reporting system running on the computing system.

Figure 3:
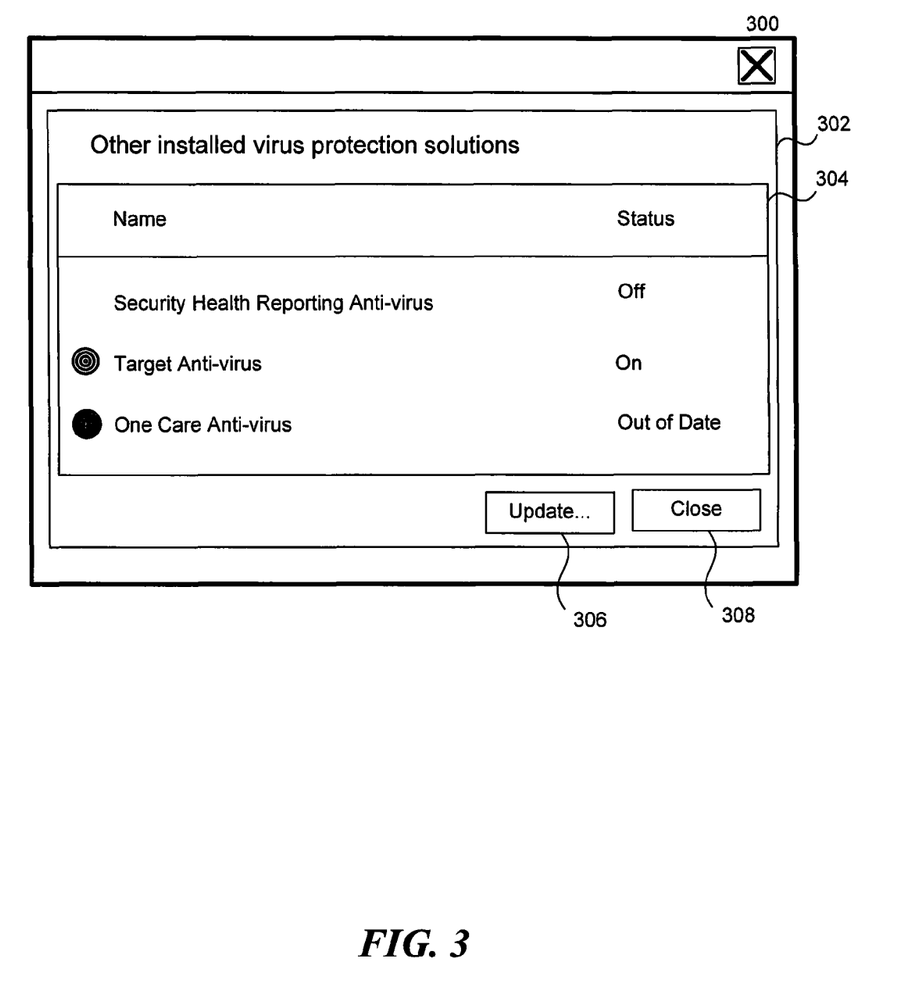
FIG. 3 is a display page that illustrates an example display of installed anti-virus solutions, according to some embodiments.

FIG. 3 is a display page that illustrates an example display of installed anti-virus solutions, according to some embodiments. A display page 300 includes a virus protection window 302 that includes a virus protection status window 304, an update control 306, and a close control 308. The virus protection status window displays the name of each virus protection solution that is installed on the computing system along with its current health status. In the example, virus protection solutions from Security Health Reporting, Target, and One Care are installed on the computing system. The virus protection status window indicates that the "Security Health Reporting anti-virus" security solution, which is the anti-virus security solution being directly provided by the security health reporting system, is currently "Off" and, therefore, not active on the computing system. The virus protection status window also indicates that the "Target anti-virus" security solution is currently "On" and, therefore active on the computing system, and that the "One Care anti-virus" security solution is currently active on the computing system, but is "Out of Date" and, therefore, needs to be updated. Also displayed are the respective logos of Target and One Care. The update control allows the user to remediate the installed virus protection solutions whose statuses are either "Out of Date" and thus require updating, or "Off" and thus require activation. In the example, selecting the update control may cause a display of one or more windows through which the user can activate (i.e., start running) the Security Health Reporting anti-virus solution and/or update the One Care anti-virus solution. The close control allows the user to close the virus protection window. The security health reporting system may provide similar displays for the other security classes that are supported by the security health reporting system.

Figure 4:
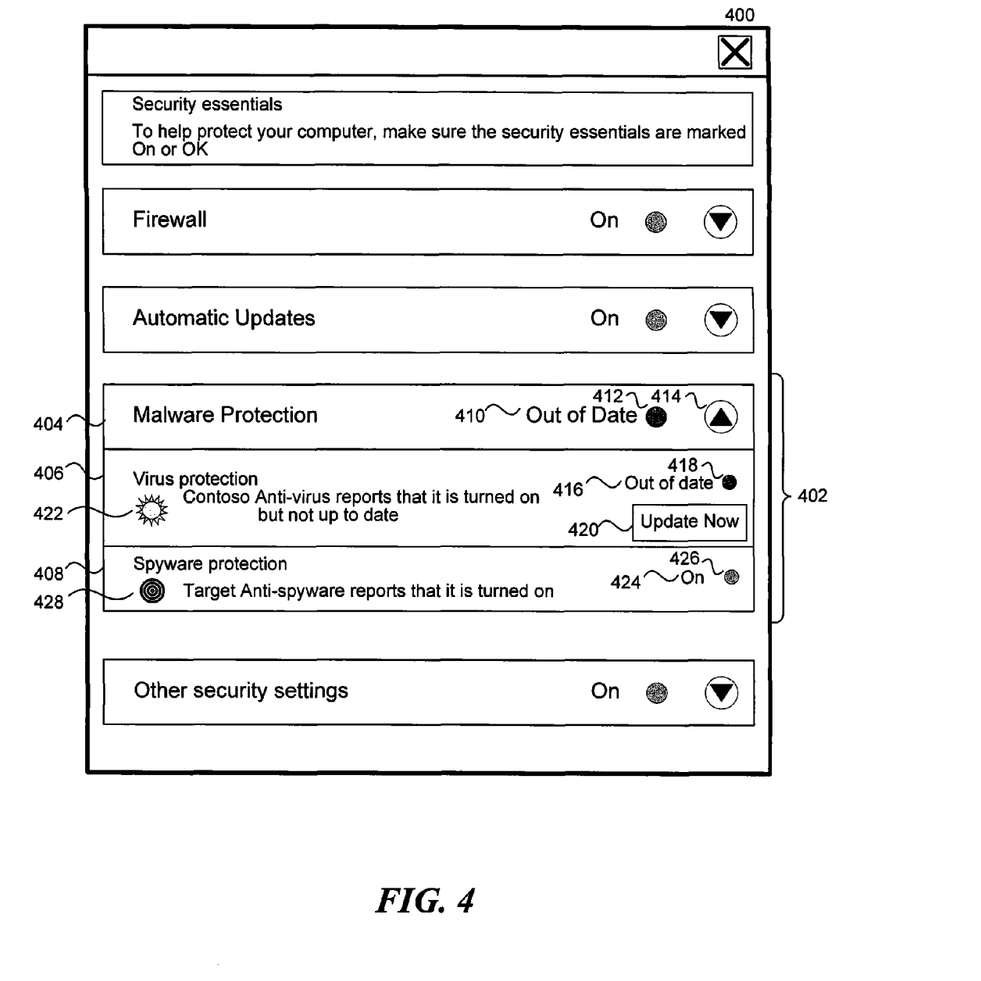
FIG. 4 is a display page that illustrates an example display of synthesized health statuses reported by the security health reporting system, according to some embodiments.

FIG. 4 is a display page that illustrates an example display of synthesized health statuses reported by the security health reporting system, according to some embodiments. A display page 400 includes a synthesized health status reporting area 402. The synthesized health status reporting area displays a synthesized health status for the computing system as determined from the health statuses reported to the security health reporting system. The synthesized health status reporting area includes a display box 404 that displays a single indication of the overall health of the computing system, and a plurality of display boxes 406 and 408 that each displays a single security state for a respective security class. In the example, display box 404 displays an indication that the overall health state of the computing system's malware protection is "Out of Date" as indicated by a text indicator 410 and a visual colored indicator 412 (e.g., a red colored indicator). Display box 404 also includes a control 414 that allows a user to control the display of additional information regarding the overall health of the computing system's malware protection. As can be seen from the additional information displayed in display boxes 406 and 408, virus protection and spyware protection security classes were synthesized to determine the overall health of the computing system's malware protection. Display box 406 displays an indication that the single security state of the virus protection (i.e., the anti-virus security class) on the computing system is "Out of Date" as indicated by a text indicator 416 and a visual color indicator 418 (e.g., a red colored indicator). The contents of display box 406 further indicate that the "Contoso Anti-virus" report is being used as the single security state of the virus protection on the computing system. Display box 406 also provides a control 420 that the user can select to remediate the Contoso anti-virus solution. Display box 406 also displays a logo 422 of the ISV Contoso. Display box 408 displays an indication that the single security state of the spyware protection (i.e., the anti-spyware security class) on the computing system is "on" as indicated by a text indicator 424 and a visual color indicator 426 (e.g., a green colored indicator). The contents of display box 408 further indicate that the "Target Anti-spyware" report is being used as the single security state of the spyware protection on the computing system. Display box 408 also displays a logo 428 of the ISV Target.

Figure 5:
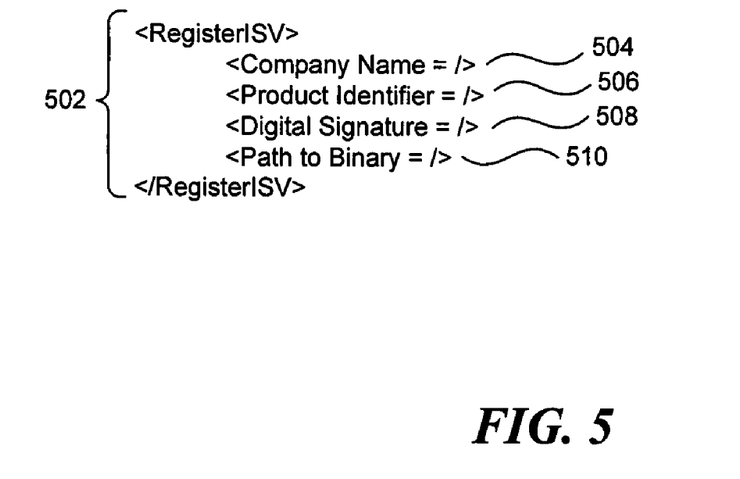
FIG. 5 illustrates a portion of an example XML schema used to register with the security health reporting system, according to some embodiments.

FIG. 5 illustrates a portion of an example XML schema used to register with the security health reporting system, according to some embodiments. ISV security solutions report values to the attributes defined in the schema in order to register with the security health reporting system. ISV security solutions register prior to using the services provided by the security health reporting system (e.g., publishing schemas, consuming published schemas, reporting its health status to the security health reporting system, etc.). The schema contains a "<registerISV>" section 502 that includes a "Company Name" element 504, a "Product Identifier" element 506, a "Digital Signature" element 508, and a "Path to Binary" element 510. The company name element specifies the name of the registering ISV. The product identifier element specifies a unique identifier for the security solution (e.g., the security software product) the ISV is registering. The digital signature element specifies the digital signature of the security solution binary (e.g., the security software product executable) that the ISV is registering. The security health reporting system uses the specified digital signature to verify the authenticity of the binary, for example, prior to executing the binary. The path to binary element specifies a path to the security solution binary that the ISV is registering.

Figure 6:
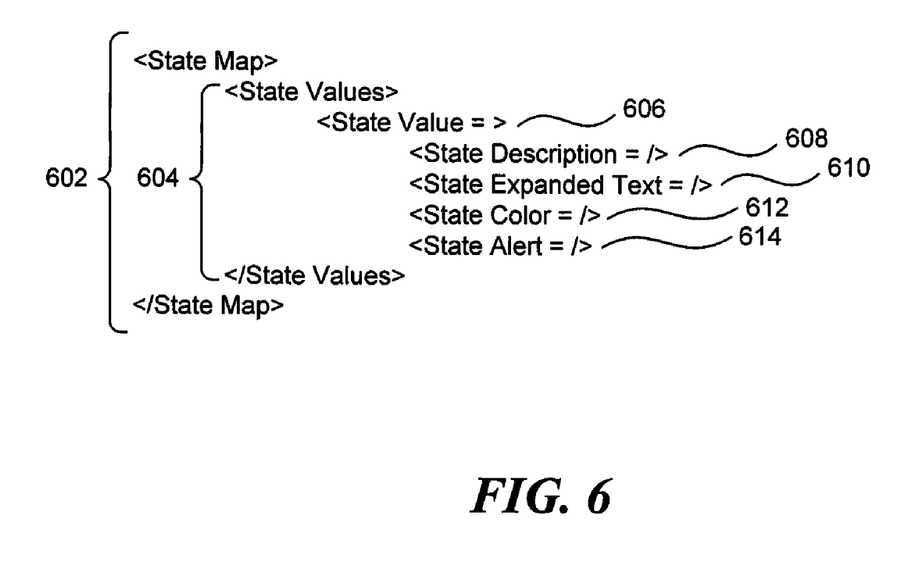
FIG. 6 illustrates a portion of an example XML schema for defining a security class, according to some embodiments.

FIG. 6 illustrates a portion of an example XML schema for defining a security class, according to some embodiments. A registered ISV security solution may create the schema, and report values to the attributes defined in the schema in order to create an instance of the security class. The schema contains a "<State Map>" section 602 that provides a state mapping for the values that are provided to populate each possible state of a security class. The State Map section contains a "<State Values>" section 604 that defines the possible states of the security class. Examples of possible states include enabled, disabled, snoozed, up-to-date, out-of-date, and the like. A consuming ISV that provides a security solution for the security class can report any one of the defined states as its health status. The State Values section includes a "State Value" element 606, a "State Description" element 608, a "State Expanded Text" element 610, a "State Color" element 612, and a "State Alert" element 614. The state value element specifies an identifier that identifies a particular security state that is being defined. The state description element specifies a literal string that describes the security state. The state expanded text element specifies a literal string that further describes the security state. The state color element specifies a color to display, for example, in the UI, when the security state is entered. The state alert element specifies whether or not an icon is to be displayed when the security state is entered. The icon may be displayed, for example, in the system tray on the UI, and may serve to provide notification that the security state has been entered.

Figure 7:
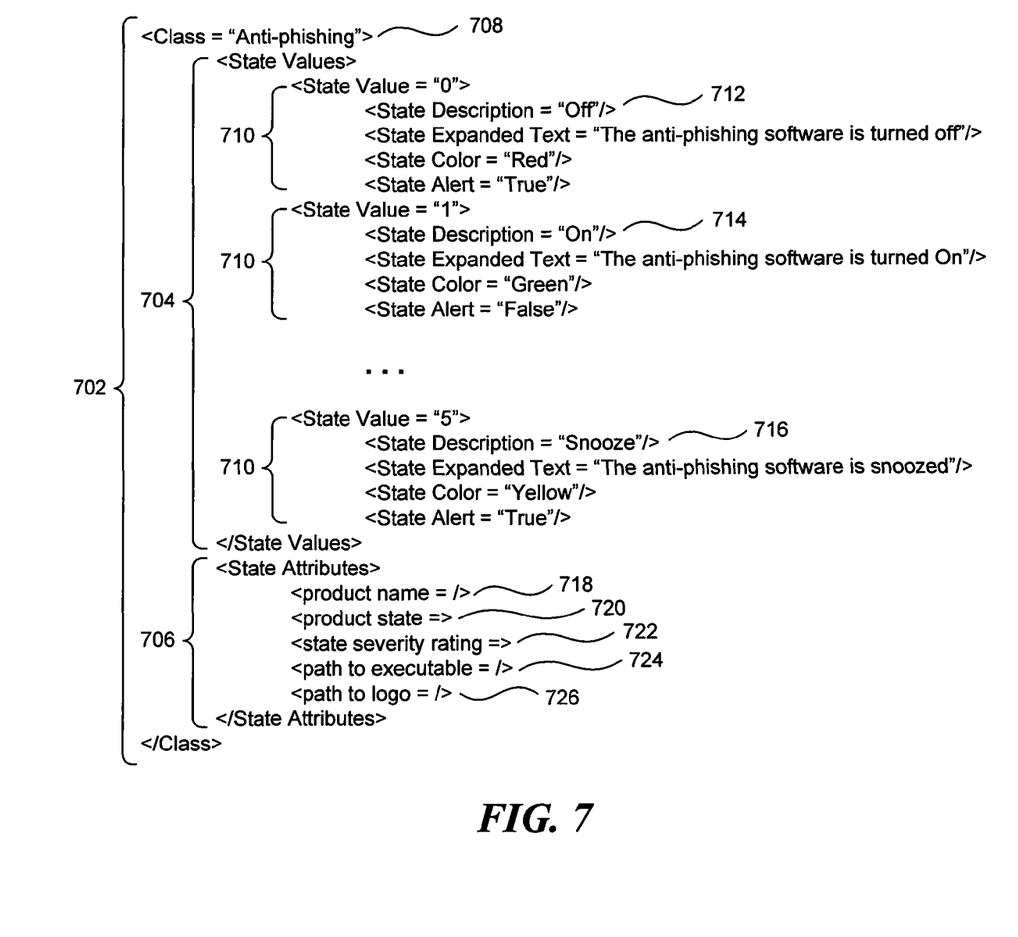
FIG. 7 illustrates a portion of an example schema instance defining a security class, according to some embodiments.

FIG. 7 illustrates a portion of an example schema instance defining a security class, according to some embodiments. A registered ISV security solution may create and publish an instance of a schema describing a security class with the security health reporting system. The schema contains a "<Class>" section that contains a "<State Values>" section 704 and a "<State Attributes>" section 706. The Class section includes a "Class" element 706 that specifies the name of the security class that is being defined by the instance of the schema. In the example, the class element indicates that the instance of the schema is defining an "Anti-phishing" security class. The State Values section contains a plurality of "<State Value>" sections 710. Each State Value section defines a possible state of the security class. In the example, the first State Value section defines the state "Off" as indicated by a "State Description" element 712, the second State Value section defines the state "On" as indicated by a "State Description" element 714, and the last State Value section defines the state "Snooze" as indicated by a "State Description" element 716. The State Attributes section specifies the attributes whose values need to be provided to report a state (i.e., health status) for the defined security class to the security health reporting system. For example, a consuming security solution may report values to these attributes to report its health status for the defined security class. The State Attributes section includes a "product name" element 718, a "product state" element 720, a "state severity rating" element 722, a "path to executable" element 724, and a "path to logo" element 726. The product name element specifies a literal string of the name of the consuming security solution that is reporting its health status. The product state element specifies an identifier that identifies the state (i.e., health status) that is being reported for the security class. The state severity rating specifies an indication (e.g., a rating) of the severity within the state that is being reported for the security class. The state severity rating provides granularity within the various states of the security class. The path to executable element specifies a path to the security solution program executable. For example, the security solution program executable may be launched through the security health reporting system to remediate the security solution. The path to logo element specifies a path to the security solution's logo.

Figure 8:
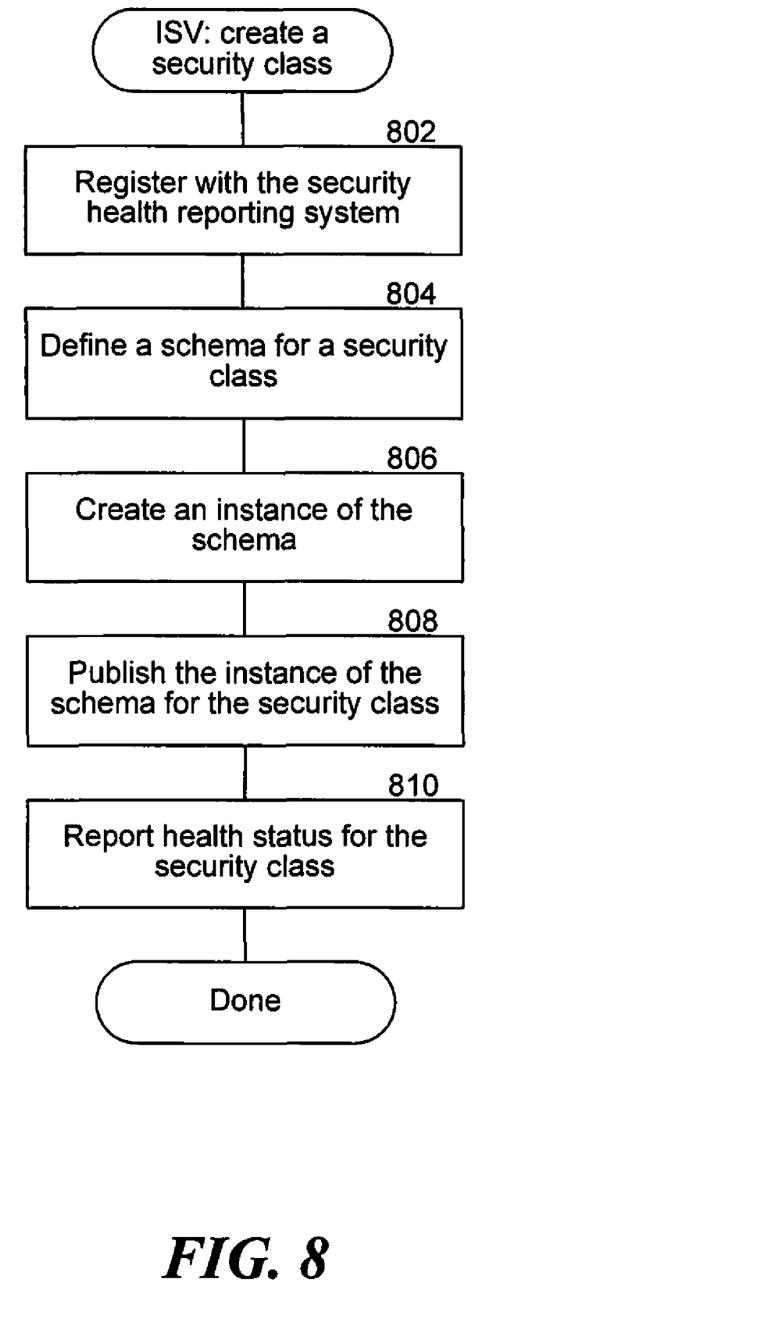
FIG. 8 is a flow diagram that illustrates the processing of an ISV application to create a security class within the security health reporting system, according to some embodiments.

FIG. 8 is a flow diagram that illustrates the processing of an ISV application to create a security class within the security health reporting system, according to some embodiments. For example, the ISV application may be a security solution that is running on the computing system on which the security health reporting system is running. Alternatively, the ISV application may be a security solution that is executing outside the computing system on which the security health reporting system is running (i.e., on a different computing system), but which wants to report its health status to the security health reporting system. In block 802, the ISV application registers with the security health reporting system. In block 804, the ISV application defines a schema for a security class that it wants to register with the security health reporting system. For example, an ISV application that provides anti-phishing services may define a schema for an anti-phishing security class. In block 806, the ISV application creates an instance of the schema by providing values to the attributes that are defined in the schema. In block 808, the ISV application publishes the instance of the schema with the security health reporting system. The ISV application may also request that the security health reporting system make the published schema public for use by other registered ISVs. In block 808, the ISV application uses the published schema to report the health status for the security class. For example, the above ISV application that provides anti-phishing services can use the published schema to report the heath status (i.e., the security state) of the anti-phishing services that is being provided by the ISV application. The ISV application continues reporting its health status as necessary, until it completes.

One skilled in the art will appreciate that, for this and other processes and methods disclosed herein, the functions/steps performed in the processes and methods may be altered in various ways. For example, the order of the outlined steps is only exemplary, and the steps may be rearranged, some of the steps may be optional, substeps may be performed in parallel, some of the steps may be combined into fewer steps or expanded into additional steps, other steps may be included, etc.

Figure 9:
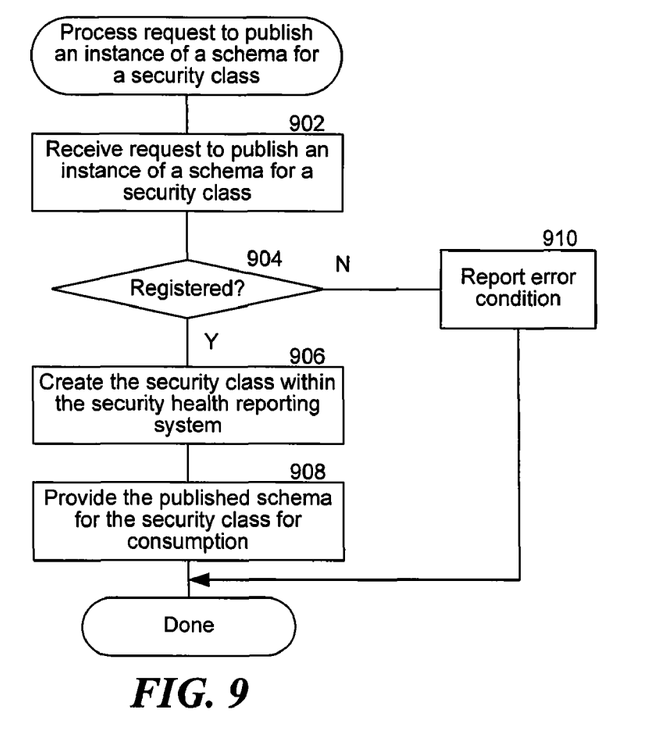
FIG. 9 is a flow diagram that illustrates the processing of the security health reporting system to process a request to publish a security class, according to some embodiments.

FIG. 9 is a flow diagram that illustrates the processing of the security health reporting system to process a request to publish an instance of a schema for a security class, according to some embodiments. For example, an ISV security solution may publish the instance of the schema with the security health reporting system. In block 902, the security health reporting system receives a request to publish the instance of the schema for a security class from the ISV security solution. In decision block 904, if the ISV security solution is registered, then the security health reporting system continues at block 906, else the security health reporting system continues at block 910. In block 906, the security health reporting system creates the security class within the security health reporting system. In block 908, the security health reporting system provides the published schema for the security class for consumption, and completes. In block 910, the security health reporting system reports the error condition, and completes. For example, the security health reporting system may record in a log file the unregistered ISV's attempt to publish an instance of a schema.

Figure 10:
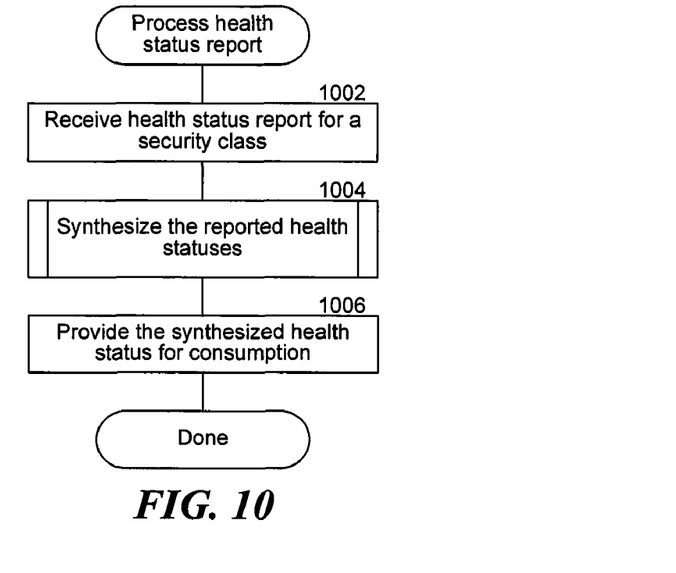
FIG. 10 is a flow diagram that illustrates the processing of the security health reporting system to process a health status report for a security class, according to some embodiments.

FIG. 10 is a flow diagram that illustrates the processing of the security health reporting system to process a health status report for a security class, according to some embodiments.

In block 1002, the security health reporting system receives a health status report for a security class. For example, a registered ISV security solution may report its health status for the security class to the security health reporting system. In block 1004, the security health reporting system synthesizes the reported health statuses. The security health reporting system may synthesize the reported health statuses to determine a single security state for each security class, and an overall health of the computing system. In block 1006, the security health reporting system provides the synthesized health status for consumption, and completes. For example, the security health reporting system may display the synthesized health status on its UI. The security health reporting system may also provide the synthesized health status available programmatically for consumption by other applications.

Figure 11:
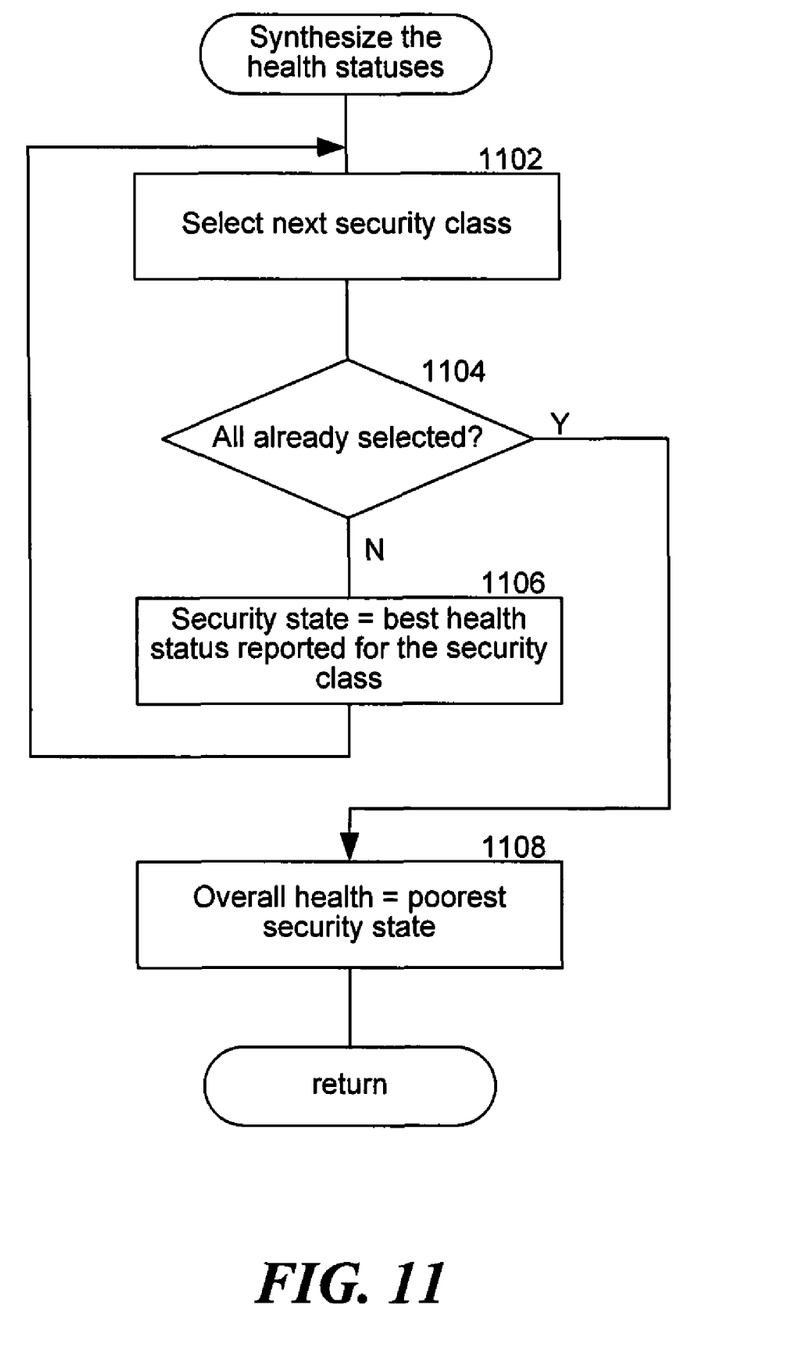
FIG. 11 is a flow diagram that illustrates the processing of the security health reporting system to synthesize the health statuses, according to some embodiments.

FIG. 11 is a flow diagram that illustrates the processing of the security health reporting system to synthesize the health statuses, according to some embodiments. In block 1102, the security health reporting system selects the next security class. In decision block 1104, if all the security classes have already been selected, then the security health reporting system continues at block 1108, else the security health reporting system continues at block 1106. In block 1106, the security health reporting system assigns as the security state for the security class the best health status reported for the security class. For example, two security solutions may have reported their respective health statuses for the same security class. The security health reporting system selects the better of the two reported health statuses as the security state for the security class. The security health reporting system then loops to block 1102 to select the next security class. In block 1108, the security health reporting system assigns as the overall health of the computing system the poorest security state, and returns. In this manner, the security health reporting system reports, for each security class, the best health status that was reported for that particular security class. For the overall health of the computing system, the security health reporting system reports the poorest health status that was reported by a security solution running on the computing system.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

We claim:

1. A security health reporting system for adding support for one or more new security classes, the security health reporting system comprising:
a memory storing computer-executable instructions of:
a provider Application Program Interface (API) component that
receives one or more schema instances describing one or more new security classes, each schema instance for reporting security health status for a new security class and providing values defining possible states of security health for the new security class along with reporting attributes for each state; and
receives security health status reports for the one or more new security classes, a security health status report for a new security class indicating a state of security health as defined by the schema instance for the new security class; and
a security health component that
creates the one or more new security classes using the schema instances within the security health reporting system to provide reporting for the one or more new security classes; and
synthesizes the received security health status reports for multiple new security classes into an overall security health status report; and
a processor that executes the computer-executable instructions stored in the memory.

2. The security health reporting system of claim 1 further comprising a component that registers a security application with the security health reporting system after determining that a schema instance for a new security class was not previously received from that security application.

3. The security health reporting system of claim 1 wherein a schema instance for a new security class is received from a security application and the overall security health status report is provided to another application.

4. The security health reporting system of claim 1 wherein the synthesizing includes receiving multiple security health status reports for a new security class and assigning the best state of security health as a single state of security healthy for the security class.

5. The security health reporting system of claim 1 wherein the synthesizing includes assigning an overall security health status that is the poorest state of security health of a new security class.

6. The security health reporting system of claim 1 wherein a new security class provides support for anti-phishing, anti-virus, and anti-spyware.

7. The security health reporting system of claim 1 further comprising a consumer API that provides the schema instances to a consumer application and provides the overall security health status report to the consumer application.

8. A computer-readable storage device having stored thereon executable instructions, which when executed, causes a computing device to perform a method for supporting for new security classes in a security system, the method comprising:
for each new security class, receiving a schema for the new security class, the schema for reporting security health status related to the new security class and providing values defining possible states of security health for the new security class along with reporting attributes for each state;
upon receiving a schema, creating the new security class within the security system such that the security system provides reporting for the new security class on the computing device;
receiving security health status reports for the new security classes, each security health status report for a new security class indicating a state of security health as defined by the schema of the new security class; and
generating an overall security health status report comprising information specifying, for each new security class, a security state for the new security class.

9. The computer-readable storage device of claim 8 further comprising registering a security application with the security health reporting system after determining that a schema instance for a new security class was not previously received from that security application.

10. The computer-readable storage device of claim 8 wherein the overall security health state report provides a single state representing overall security health, the state being synthesized from the received security health status reports.

11. The computer-readable storage device of claim 8 wherein a schema for a new security class is received from a security application and the overall security health status report is provided to another application.

12. The computer-readable storage device of claim 8 wherein the generating includes receiving multiple security health status reports for a new security class and assigning the best state of security health as a single state of security healthy for the security class.

13. The computer-readable storage device of claim 8 wherein the generating includes assigning an overall security health status that is the poorest state of security health of a new security class.

14. The computer-readable storage device of claim 8 further comprising wherein a new security class provides support for anti-phishing, anti-virus, and anti-spyware.

15. A method performed by a computing device, the method comprising:
- for each of a plurality of security applications, receiving a schema for a new security class of the security application, the schema for reporting security health status related to the new security class;
- upon receiving a schema, creating the new security class within the security system such that the security system provides reporting for the new security class on the computing device;
- for each of the plurality of security applications, receiving a security health status report for the new security class of the security application, each security health status report indicating a state of security health as defined by the schema of the new security class and reported by the security application; and
- generating an overall security health status report for the computing device based on an aggregation of the received security health status reports.

16. The method of claim 15 including registering a security application after determining that a schema for a new security class received from that security application was not previously received from that security application.

17. The method of claim 15 wherein the overall security health status report is provided to an application other than a security application.

18. The method of claim 15 wherein the generating includes receiving multiple security health status reports for a new security class and assigning the best state of security health as a single state of security healthy for the security class.

19. The method of claim 15 wherein the generating includes assigning an overall security health status that is the poorest state of security health of a new security class.

20. The method of claim 15 further comprising wherein a new security class provides support for anti-phishing, anti-virus, and anti-spyware.

\* \* \* \* \*